United States Patent

[11] 3,566,984

| [72] | Inventor | Ludwig Weickhardt |
| | | Bovenden, Germany |
| [21] | Appl. No. | 861,310 |
| [22] | Filed | Sept. 26, 1969 |
| [45] | Patented | Mar. 2, 1971 |
| [73] | Assignee | Sartorius-Werke G.m.b.H. |
| | | Gottingen, Germany |
| [32] | Priority | Oct. 2, 1968 |
| [33] | | Germany |
| [31] | | P 18 00 689.8 |

[54] BEAM SPRING BALANCE WITH RIGIDITY-CONTROLLING EQUALIZER SPRING
7 Claims, 5 Drawing Figs.

[52] U.S. Cl. .................................................. 177/225,
177/168, 177/175
[51] Int. Cl. ............................................. G01g 3/04,
G01g 1/24, G01g 23/02
[50] Field of Search ........................................ 177/164,
168—170, 175, 225

[56] References Cited
UNITED STATES PATENTS

| 1,576,948 | 3/1926 | Cameron | 177/175 |
| 1,806,741 | 5/1931 | Cameron | 177/175X |
| 2,681,222 | 6/1954 | Stelzer | 177/168 |
| 2,681,566 | 6/1954 | Ruge | 177/225UX |
| 2,698,747 | 1/1955 | Stelzer | 177/168 |
| 3,287,721 | 11/1966 | Baehr | 177/164UX |
| 3,373,830 | 3/1968 | Thomson | 177/168 |

FOREIGN PATENTS

| 61,730 | 12/1954 | France | 177/170 |
| 732,744 | 6/1955 | Great Britain | 177/225 |
| 1,052,721 | 12/1966 | Great Britain | 177/168 |

*Primary Examiner*—Robert S. Ward, Jr.
*Attorney*—Edmund M. Jaskiewicz

ABSTRACT: A spring balance having a balance beam, at least one spring acting on the balance beam and absorbing the load torque, and an arrangement for adapting the balance to changes in the force of gravity. The arrangement comprises at least one equalizer spring one end of which is connected to the balance support mounting by means of a device for changing the length thereof and the other end of the equalizer spring is fastened on the beam, or on a part of the balance connected to the beam for common movement. The arrangement is such that the direction of force of the equalizer spring in the neutral position of the balance extends approximately at right angles to the direction of movement of the fastening point on the balance beam or balance part and, with the balance loaded, a force component of the equalizer spring exerts on the balance beam torque directed against its deflection by the load whereby the rigidity of the spring system can be changed.

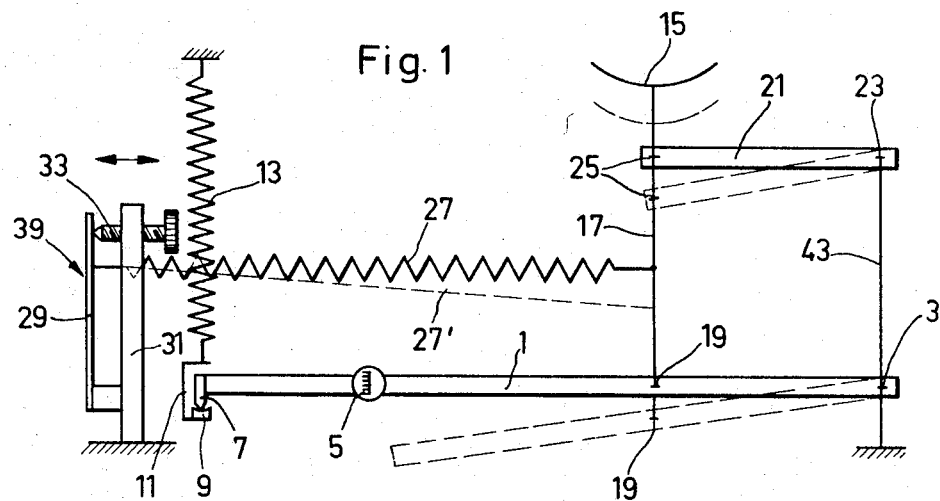
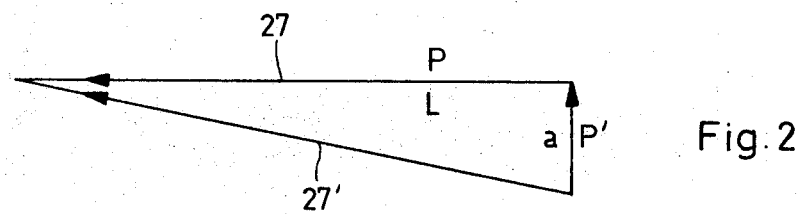
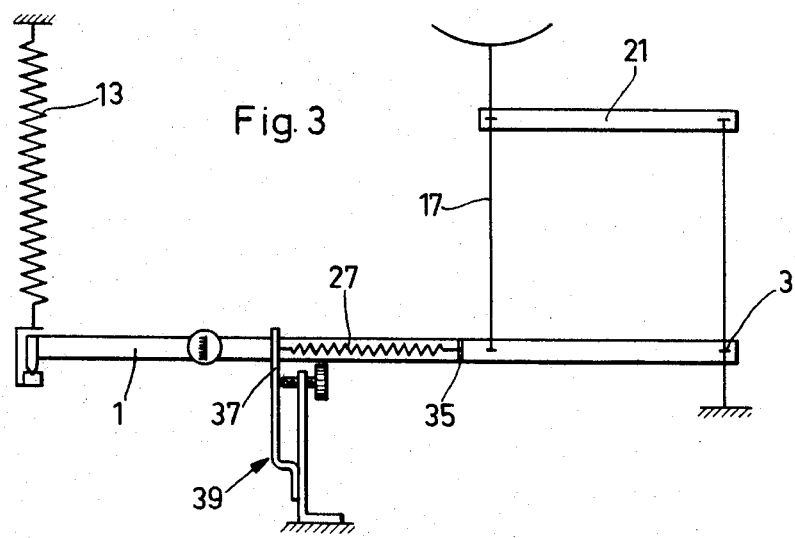

3,566,984

BEAM SPRING BALANCE WITH RIGIDITY-CONTROLLING EQUALIZER SPRING

BACKGROUND OF THE INVENTION

This invention relates to a spring balance with a balance beam, having at least one spring acting on the beam, which is called hereinafter the "load spring," absorbing the load torque. The support and load bearings of the beam balance can be formed by knife edges and pans or by torsion tension bands.

Spring balances have in general a constant spring rigidity. By "rigidty" or "spring rigidity" in this case is meant the physical magnitude which is otherwise also designated as "spring elasticity constant" and is equal to the quotients of spring force and spring extension. As a result of the constant spring rigidity, known balances can be used only at one location at a specific geographical latitude as well as at a specific altitude above sea level, because they indicate falsely at other locations. An adjustment of the neutral point by displacement of the fixed point of suspension of the load spring would in this case be of no avail, since deflections of the spring under an altered magnitude of the force of gravity would no longer match the scale. For example, at a fairly high altitude above sea level a load increases of 1 g results in an increase in the spring extension which is smaller than indicated on the scale, if the beam deflection has been adjusted for a lower-lying location. In order to make spring balances usable for locations at a different geographical latitude or height above sea level, the rigidity of the spring or springs absorbing the load must be changed.

OBJECT OF THE INVENTION

The object of the invention is to provide a spring balance having a spring arrangement, the rigidity of which is adjustable.

Another object is to provide a spring balance having an arrangement for adapting the balance to changes in the force of gravity, comprising at least one equalizer spring.

A further object is to provide a spring balance having an equalizer spring and means fastening one end thereof on the balance beam, the direction of force of the equalizer spring in the neutral position of the balance, extending approximately at right angles to the direction of movement of the fastening point of said means on the balance beam.

In accordance with the invention there is provided a spring balance having a balance beam, at least one spring acting on the balance beam and absorbing the load torque and with an arrangement for adapting the balance to changes in the force of gravity, comprising at least one equalizer spring one end of which is connected to the balance support mounting by means of a device for changing the length thereof and the other end of the equalizer spring is fastened in such a way on the beam or on a part of the balance connected to the beam for common movement the direction of force of the equalizer spring in the neutral position of the balance extends approximately at right angles to the direction of movement of the fastening point of the balance beam or balance part, and wherein, with the balance loaded, a force component of the equalizer spring exerts on the balance beam a torque directed against its deflection by the load whereby the rigidity of the spring system can be charged.

The balance of the invention may either employ a single equalizer spring or two equalizer springs acting in opposed directions or several springs arranged in stellate manner. In any event, it is essential that, in the neutral position of the balance, the direction of force of the equalizer spring or springs extends perpendicularly to the movable balance part to which it is, or they are, connected, so that the spring or springs initially have no effect.

Upon a deflection of this balance part, as a result of a load being applied, the equalizer spring or springs range themselves somewhat obliquely to this balance part, so that a component of the spring force takes effect in the direction of movement of the balance part. This force component acts on the balance beam in the same direction of rotation as the load spring; in other words it produces an equidirectional torque. From this it emerges that the spring rigidity of the entire spring system is composed of the spring rigidity of the load spring and a part of the spring rigidity of the equalizer spring(s).

If the entire spring rigidity is to be changed, for example, to be reduced, because the balance is to be set up at a location of greater height above sea level, then one reduces the length of the equalizer spring(s) and therewith the spring force thereof. By this means, the magnitude of the above-mentioned component of the spring force is also reduced, namely for deflection of the balance part. However, if the magnitude of the components that are to be added has become smaller, then the total rigidity of the spring arrangement must also have been reduced.

The same also applies when the direction of force of the equalizer spring or springs in the neutral position of the balance does not extend exactly perpendicularly to the movable balance part to which they are connected.

BRIEF DESCRIPTION OF THE DRAWINGS

FIGS. 1 and 3 to 5 show, each in a highly diagrammatic side view, a spring balance in accordance with the invention with different arrangements of a single equalizer spring;

FIG. 2 shows a triangle of forces; and

FIGS. 1 and 3 to 5 each show a balance beam 1, which is suspended in a stationarily held torsion band 3.

DETAILED DESCRIPTION OF THE APPARATUS

Figure 4:
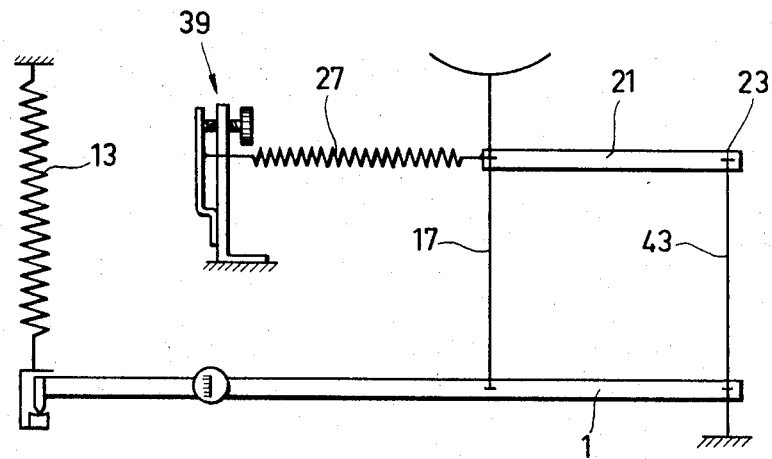

The beam carries a microscale 5 for a projection apparatus and a downwardly directed extension 7, whose tip or knife edge acts on a pan 9 of a suspension 11. Fastened to the upper end of the suspension is the lower end of the load spring 13. The upper end of the load spring is attached to the balance frame. For the neutral-point adjustment, the fastening point on the balance frame can be adjusted in the direction of the spring 13.

A load dish 15 is braced via its load dish supports 17 and a torsion tension band 19 on the balance beam 1. Provided for the perpendicular parallel guidance of the disc supports 17 is a guide rod 21, which is rotatable about a stationary torsion tension band 23 and is mounted through a further torsion tension band 25 on the dish support 17.

In the case of the specific embodiment of FIG. 1, the equalizer spring 27 acts with its right-hand end of on the dish support 17 and with its left-hand end on a leaf spring 29, the lower end of which is fastened to an upright 31 of the balance frame. Extending horizontally through the upper end of the part 31 is a setscrew 33, through the actuation whereof the upper end of the leaf spring 29 can be bent out to a greater or lesser degree and the equalizer spring 27 can therewith be made longer or shorter.

In the neutral position, represented in solid lines, of the balance, the direction of force of the equalizer spring 27 extends exactly at right angles to the plane of the load dish support 17.

If a load is placed on the dish 15, then the load dish support 17 move downwards and the parts assume, for example, the position shown in broken lines. The direction of force of the spring 27 is designated for this position by 27'.

In the case of the specific embodiment of FIG. 3, the equalizer spring 27 acts at 35 on the balance beam 1. Its other end acts on a leaf spring 37 of a length setting device 39. The direction of force of the spring falls into a straight line which, in the neutral position of the balance, intersects the support bearing 3 of the balance beam. The spring end connected to the length setting device lies, viewed from the support bearing, on the other side of the point of attachment 35.

In the case of the specific embodiment of FIG. 4, the right-hand end of the equalizer spring 27 is fastened to the left-hand end of the guide rod 21. The left-hand spring end is again fastened to the length setting device 39, which is however, compared with FIG. 3, accommodated at a different point of the balance frame. The direction of force of the spring lies in a straight line which intersects the torsion tension band 23 of the guide rod 21.

Figure 5:
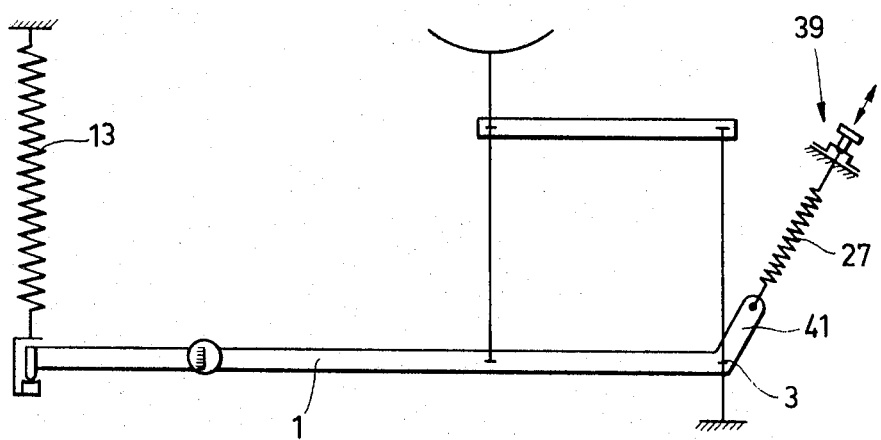

In the case of the specific embodiment of FIG. 5, the balance beam 1 has, in the vicinity of its support bearing 3, a bent extension 41, on the end of which the one end of the equalizer spring 27 acts. The other spring end is again fastened to the length setting device 39, which in this case is merely indicated approximately as one would see it from above in FIG. 4. The direction of force of the equalizer spring 27 lies in a straight line which intersects the support bearing 3.

In all the specific embodiments, the direction of force of the equalizer spring 27 extends in the represented neutral position of the balance exactly vertically or perpendicularly to the direction to which the point of attack of the spring on the balance beam 1, guide rod 21 or dish support 17 begins to move when the balance is loaded.

The method of operation of the equalizer spring will be explained with reference to FIG. 2. The long cathetus of the right-angled triangle represents the magnitude $P$ and the direction of force of the equalizer spring 27 in the neutral position of the balance. The hypotenuse $27'$ represents the magnitude and direction of the force of this spring after deflection of the balance. The short cathetus then denotes an extent for the force component $P'$, which in addition arises upon deflection of the spring and is brought about by the extension of the spring. Furthermore, the upper cathetus denotes the length $L$ of the equalizer spring 27 in the neutral position of the balance and the short cathetus denotes the deflection $a$ of the dish support 17.

$$\frac{P'}{P} = \frac{a}{L} \qquad (1)$$

then applies.

If one designates by $Lo$ the original length of the equalizer spring 27, at which it still does not exert any traction, then the spring has been extended by $L - Lo$.

$$P = (L - Lo)c \qquad (2)$$

therefore applies, where $c$ denotes the spring rigidity of the equalizer spring 27.

If one inserts in formula (1) the value for $P$ from formula (2), then there emerges:

$$P' = \frac{L - L_o}{L} ac = (1 - \frac{L_o}{L}) ca \qquad (3)$$

$P'$ is accordingly directly proportional to the deflection $a$, whilst the remaining expression standing to the right represents a constant for any setting of the length setting device 39. In this case, the expression: $(1 - L - Lo) c$ thus denotes altogether the spring rigidity, insofar as it is a question of the component $P'$ of the equalizer spring 27. Herein the length $L$ is variable through the length setting device 39. If $L$ is made greater, then the expression $Lo/L$ becomes smaller and the expression $1 - Lo/L$ therewith becomes greater. Through extension of the equalizer spring 27, one can thus increase the spring rigidity, so far as it relates to the component $P'$. Consequently the total spring rigidity of the spring system can be changed, for the total spring rigidity is composed of that of the spring 13 and the spring rigidity with regard to the component $P'$. Upon calculation, it would still have to be taken into account that the spring 13 and the component $P'$ act on lever arms of different length.

In all the exemplified embodiments, only a single equalizer spring 27 has been shown, namely in the shape of a draw tension spring. However, although the use of a compression spring is somewhat more disadvantageous on account of possible deflections of the compression spring, in principle also a compression spring can be used as an equalizer spring.

Furthermore, in place of the one equalizer spring provided, several such springs can be used. Preferably, two draw springs can by way of example act in FIG. 1 on the dish support 17, the effective straight lines of which springs lie, with the balance unloaded unloaded, in a common straight line at right angles to the drawing plane, so that the one spring extends forwards and the other rearwards. By this means, undesirable tractions of the springs which load the tension bands 3, 23, 25, 19 are cancelled out.

In the case of the last-mentioned spring arrangement, instead of the comparatively simple length setting device 39 a somewhat complicated device has to be used, namely an expanding device, which can move apart by like amounts the two spring ends directed one against the other. Since expanding devices are known 'per se,' a closer description and representation is superfluous here.

This invention is not to be confined to any strict conformity to the showing in the drawings but changes or modifications may be made therein so long as such changes or modifications mark no material departure from the spirit and scope of the appended claims.

I claim:

1. A spring balance comprising an inclination means which comprises a balance beam, a balance support mounting, a load dish, and means supporting said load dish on said inclination means, first spring means with one end thereof being fixed and the other end acting on the inclination means and absorbing the load torque, equalizer spring means, means for changing the effective length of said equalizer spring means and for connecting one end of said equalizer spring means to said balance support mounting, means fastening to the other end of the equalizer spring means to the inclination means whereby the direction of force of the equalizer spring means in the neutral position of the balance extends approximately at right angles to the direction of movement of the fastening point of said equalizer spring means to said inclination means and, with the balance loaded, a force component of the equalizer spring means exerts on the balance beam a torque directed against its deflection by the load whereby the rigidity of the spring system can be changed.

2. A spring balance as claimed in claim 1, further comprising a tension spring constituting the equalizer spring which acts on the balance beam, the direction of force of said equalizer spring in the neutral position of the balance falling into a straight line intersecting the support bearing, both ends of said tension spring being outside the support bearing.

3. A spring balance as claimed in claim 2, wherein the end of the equalizer spring fixed on the balance frame is further spaced from said support bearing than the equalizer spring end fastened to the balance beam.

4. A spring balance as claimed in claim 1, further comprising a parallelogram guidance system including a guide rod and a stationary bearing therefor, a tension spring constituting the equalizer spring, the direction of force of the equalizer spring in the neutral position of the balance falling into a straight line intersecting the stationary bearing of the guide rod, both equalizer spring ends being outside of this bearing.

5. A spring balance as claimed in claim 4, wherein the spring end fixed on the balance frame is further spaced from said stationary bearing than the spring end fastened to the guide rod.

6. A spring balance as claimed in claim 1, further comprising a parallelogram guidance system, a part vertically conducted by said guidance system, a tension spring constituting the equalizer spring, means one end of said equalizer spring means fastened at said vertically conducted part, the force direction of the equalizer spring means in the neutral position of the balance extending horizontally, and the end of the equalizer spring means fixed on the balance frame acting at a point outside of a vertical plane, which contains the stationary axes of the parallelogram guidance system.

7. A spring balance as claimed in claim 6, wherein the end of the equalizer spring means fixed on the balance frame lies, considered from said plane, on the opposite side of the vertically conducted part of the balance.